US012025285B2

(12) United States Patent
Lee

(10) Patent No.: US 12,025,285 B2
(45) **Date of Patent: *Jul. 2, 2024**

(54) LAMP MODULE FOR VEHICLE AND LAMP FOR VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,362

(22) Filed: Jun. 30, 2023

(65) Prior Publication Data

US 2024/0019095 A1 Jan. 18, 2024

(30) Foreign Application Priority Data

Jul. 13, 2022 (KR) ........................ 10-2022-0086186

(51) Int. Cl.
*F21S 41/14* (2018.01)
*F21S 41/24* (2018.01)
*F21S 41/32* (2018.01)

(52) U.S. Cl.
CPC ............... *F21S 41/24* (2018.01); *F21S 41/18* (2018.01); *F21S 41/322* (2018.01)

(58) Field of Classification Search
CPC .......... F21S 41/24; F21S 41/322; F21S 41/18; F21S 41/27; F21S 41/25; F21S 41/285; F21S 41/255; F21S 41/275; F21S 43/26; F21S 41/265; F21S 43/237; F21S 43/239; F21S 41/26; F21S 43/241; F21S 43/236; F21S 43/235; F21S 43/315; G02B 6/00; G02B 6/0028; G02B 19/0028; G02B 27/0905; G02B 27/09; G02B 27/0911; G02B 19/0023; G02B 19/0019; F21V 7/0091; B60R 1/1207; F21W 2107/10; F21W 2102/13; F21W 2102/135;
(Continued)

(56) References Cited

U.S. PATENT DOCUMENTS 11,754,245 B1 * 9/2023 Lee ........................ F21S 41/147 362/511
2002/0080615 A1 * 6/2002 Marshall .................. F21V 5/04 362/333
(Continued)

FOREIGN PATENT DOCUMENTS

KR 20220089401 A * 6/2022

OTHER PUBLICATIONS

Search English translation of KR 20220089401 A (Year: 2022).*
Claims listing from U.S. Appl. No. 18/345,281 (Year: 2023).*

*Primary Examiner* — Omar Rojas Cadima
(74) *Attorney, Agent, or Firm* — NovoTechIP International PLLC

(57) ABSTRACT

Disclosed is a lamp module for a vehicle including a first light source that outputs light, a light guide part provided on a front side of the first light source, and a first optic member provided between the first light source and the light guide part, to which the light output from the first light source is input, and that outputs the light input from the first light source to the light guide part, a first recessed area having a shape that is recessed upwards is formed on a lower surface of the light guide part.

17 Claims, 5 Drawing Sheets

(58) Field of Classification Search
CPC ........... F21W 2103/55; F21W 2102/18; F21W 2102/00; F21W 2102/155; F21W 2103/20; F21W 2102/145
See application file for complete search history.

(56) References Cited

U.S. PATENT DOCUMENTS

| | | | | |
|---|---|---|---|---|
| 2004/0156209 | A1 * | 8/2004 | Ishida | F21S 41/176<br>257/E33.059 |
| 2017/0030543 | A1 * | 2/2017 | Gromfeld | F21S 41/663 |
| 2019/0017675 | A1 * | 1/2019 | Suwa | F21S 41/24 |

* cited by examiner

LAMP MODULE FOR VEHICLE AND LAMP FOR VEHICLE INCLUDING THE SAME

CROSS-REFERENCE TO RELATED APPLICATIONS

This application claims the benefit of priority to Korean Patent Application No. 10-2022-0086186, filed in the Korean Intellectual Property Office on Jul. 13, 2022, the entire contents of which are incorporated herein by reference.

TECHNICAL FIELD

The present disclosure relates to a lamp module for a vehicle and a lamp for a vehicle including the lamp module, and more particularly, to a lamp module for a vehicle having an improved optical efficiency and a lamp for a vehicle including the lamp module.

BACKGROUND

Various kinds of lamps for a vehicle are mounted on vehicles according to functions thereof. For example, low beam lamps, high beam lamps, and daytime running light (DRL) lamps, and the like are mounted on a front side of a vehicle.

According to a conventional technology, because various kinds of lamps are mounted on a vehicle together, requirements of users in an aspect of design of a vehicle when lamps are turned on cannot be satisfied as light emission surfaces formed by the lamps are different, and spaces occupied by the lamps in the vehicle are excessively large as the various kinds of lamps are mounted on the vehicle.

Furthermore, according to the conventional technology, chromatic aberrations occur as refractive indexes of lenses provided in the lamp for a vehicle are different, and this deteriorates product values of light distribution patterns.

SUMMARY

The present disclosure has been made to solve the above-mentioned problems occurring in the prior art while advantages achieved by the prior art are maintained intact.

An aspect of the present disclosure provides a lamp module having a structure that may be differentiated in an aspect of design of a vehicle by, one lamp for a vehicle, performing two or more functions such that one light emission surface may be shared even when lamps of different functions are turned on.

Another aspect of the present disclosure provides a lamp module for a vehicle that may enhance a product value of a light distribution pattern by minimizing chromatic aberrations that occur as refraction indexes of lenses are different according to wavelengths of light.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp module for a vehicle includes a first light source that outputs light, a light guide part provided on a front side of the first light source, and a first optic member provided between the first light source and the light guide part, to which the light output from the first light source is input, and that outputs the light input from the first light source to the light guide part, a first recessed area having a shape that is recessed upwards is formed on a lower surface of the light guide part, the first optic member includes an optic rear surface provided on a rear side of the first optic member and facing the first light source, an optic front surface provided on a front side of the first optic member and facing the light guide part, and an optic connection surface connecting the optic rear surface and the optic front surface, and at least a portion of the light output from the first light source and input to the first optic member is totally reflected by the optic connection surface and is input to the light guide part.

The optic connection surface may have a shape having an optical path, in which at least portions of the light output from the first light source and totally reflected by the optic connection surface cross a height direction "H" when the light guide part is viewed from one side of a widthwise direction "W".

The optic connection surface may have a shape having an optical path, in which at least portions of the light output from the first light source and totally reflected by the optic connection surface cross the height direction "H" after meeting each other in one area.

The optic connection surface may have a rotational symmetrical shape with respect to a central axis AX that extends in a forward/rearward direction "F".

The first recessed area may include a first surface provided in a rear area of the first recessed area, a second surface provided in a front area of the first recessed area, and a third surface connecting an upper end of the first surface and an upper end of the second surface, and an area, in which the at least portions of the light output from the first light source and totally reflected by the optic connection surface cross the height direction "H" when the light guide part is viewed from the one side of the widthwise direction "W", may be formed on a rear side of the third surface.

The area, in which the at least portions of the light output from the first light source and totally reflected by the optic connection surface cross the height direction "H" when the light guide part is viewed from the one side of the widthwise direction "W", may be formed on a front side of the optic front surface.

A set of focuses of the optic connection surface may have a circular shape, a center of which is the central axis AX.

A curvature of the optic rear surface may be larger than a curvature of the optic front surface.

The lamp module may further include a second light source provided on a lower side of the light guide part to face a lower surface of the light guide part, and a second optic member facing the second light source.

The light guide part may include a first input surface formed on the lower surface of the light guide part and to which at least a portion of the light output from the first light source is input, and a second input surface formed in the first recessed area of the light guide part, to which at least a portion of the light output from the second light source and input to the second optic member is input, and the second input surface may be located on a lower side of a function division surface that is an imaginary surface obtained by connecting an uppermost end of the rear surface of the light guide part and a lowermost end of a front surface of the light guide part.

The second optic member may include an optic input area formed in an area facing the second light source and to which at least a portion of the light output from the second light source is input, and an optic output area formed on an opposite side to a portion of the second optic member, at which the optic input area is formed, and from which at least a portion of the light input to the optic input area is output, the optic input area may be formed to concentrate the light output from the second light source and input to the optic input area, and the optic output area may be formed to diffuse the light concentrated in the optic input area.

The optic input area may have a convex lens shape protruding toward the second light source, and the optic output area may have a concave lens shape recessed toward the second light source.

The first surface may be inclined upwards as it goes to a front side, the second surface may be inclined downwards as it goes to the front side, and the third surface may include a front extension section extending forwards from the first surface, and a lower extension section extending downwards from a front end of the front extension section and connected to the second surface.

The third surface may further include a cutoff part formed in the front extension section and having a stepped shape, in which heights of opposite side surfaces thereof, which are spaced apart from each other in the widthwise direction "w", are different.

A front surface of the light guide part may include a first curved area having a curved shape protruding convexly toward a front side of the light guide part, and a second curved area provided on an upper side of the first curved area and having a curved shape recessed convexly toward a rear side.

A radius of curvature of the second curved area may be smaller than a radius of curvature of the first curved area around an area, in which the first curved area and the second curved area meet each other.

At least a portion of the light output from the first light source may be output to an outside after passing through a rear surface of the light guide part to form a first light distribution pattern, at least a portion of the light output from the second light source may be output to an outside after passing through the first recessed area of the light guide part to form a second light distribution pattern, the first light distribution pattern may be formed by a portion of the light output from the first light source, which passed through the first curved area, and the second light distribution pattern may be formed by a portion of the light output from the second light source, which passed through the second curved area.

A lower surface of the light guide part may further include an inclined surface provided on a front side of the first recessed area, extending from a lower end of the first recessed area, and formed to be inclined upwards as it goes to a front side, and the inclined surface may be located on a lower side of a function division surface that is an imaginary surface obtained by connecting an uppermost end of the rear surface of the light guide part and a lowermost end of a front surface of the light guide part.

According to an aspect of the present disclosure, a lamp for a vehicle including a plurality of lamp modules for a vehicle is provided, each of the plurality of lamp modules includes a first light source that outputs light, a light guide part provided on a front side of the first light source, and a first optic member provided between the first light source and the light guide part, to which the light output from the first light source is input, and that outputs the light input from the first light source to the light guide part, a first recessed area having a shape that is recessed upwards is formed on a lower surface of the light guide part, the first optic member includes an optic rear surface provided on a rear side of the first optic member and facing the first light source, an optic front surface provided on a front side of the first optic member and facing the light guide part, and an optic connection surface connecting the optic rear surface and the optic front surface, and at least a portion of the light output from the first light source and input to the first optic member is totally reflected by the optic connection surface and is input to the light guide part.

The plurality of lamp modules may include a plurality of upper lamp modules provided on an upper side and arranged in a horizontal direction, and a plurality of lower lamp modules provided on a lower side of the upper lamp module and arranged in the horizontal direction, and shapes of front surfaces of light guide parts provided in the upper lamp modules and shapes of front surfaces of light guide parts provided in the lower lamp modules may be different.

A front surface of the light guide part may include a first curved area having a curved shape protruding convexly toward a front side of the light guide part, a second curved area provided on an upper side of the first curved area and having a curved shape protruding convexly toward a front side, and a second recessed area provided on a lower side of the first curved area and having a shape recessed upwards, and the second recessed areas may be provided only the plurality of lower lamp modules.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a lamp module for a vehicle and a lamp for a vehicle according to the present disclosure will be described with reference to the drawings.

Lamp Module for Vehicle

Figure 1:
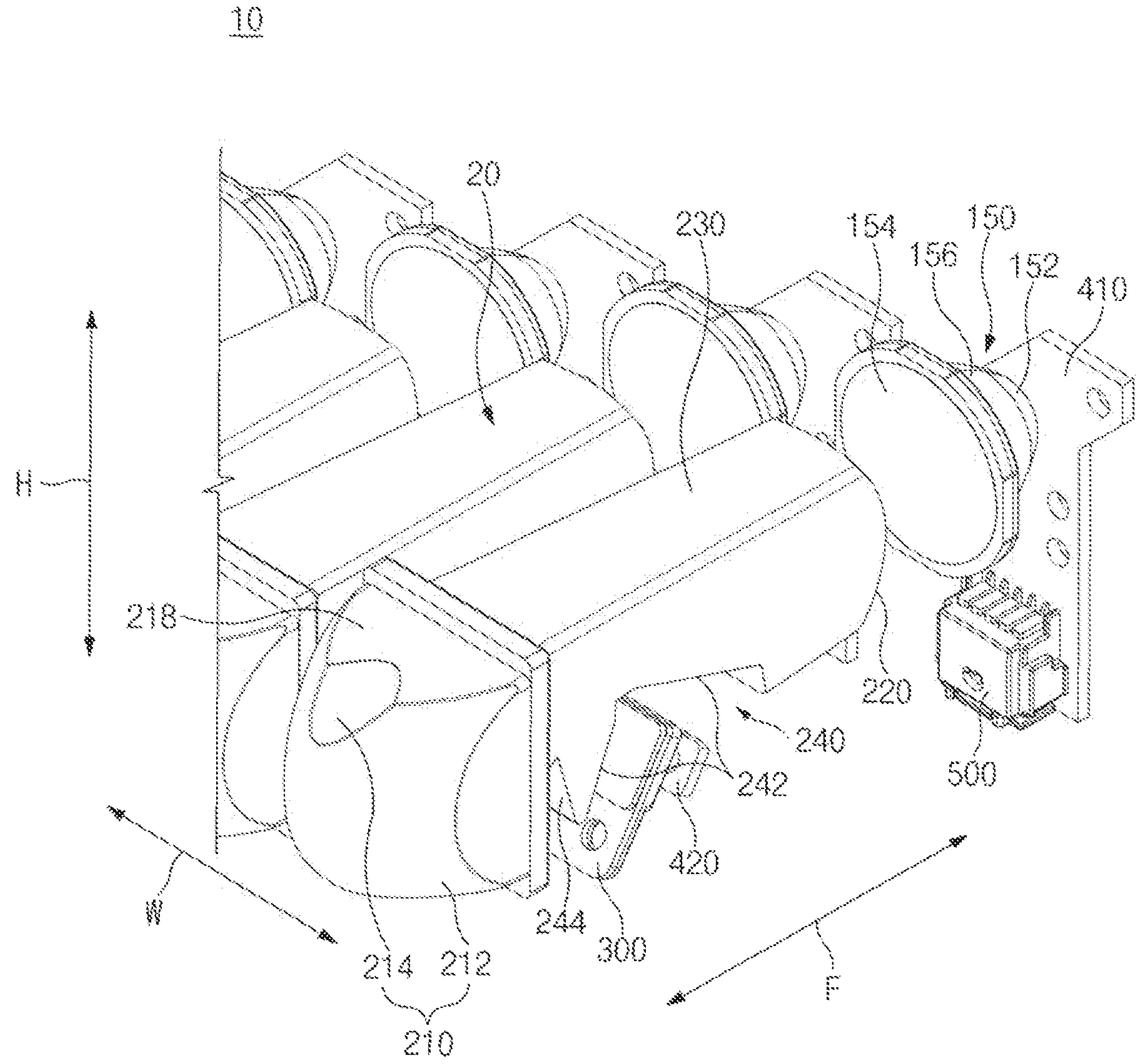
FIG. 1 is a perspective view illustrating a lamp module for a vehicle according to an embodiment of the present disclosure.
Figure 2:
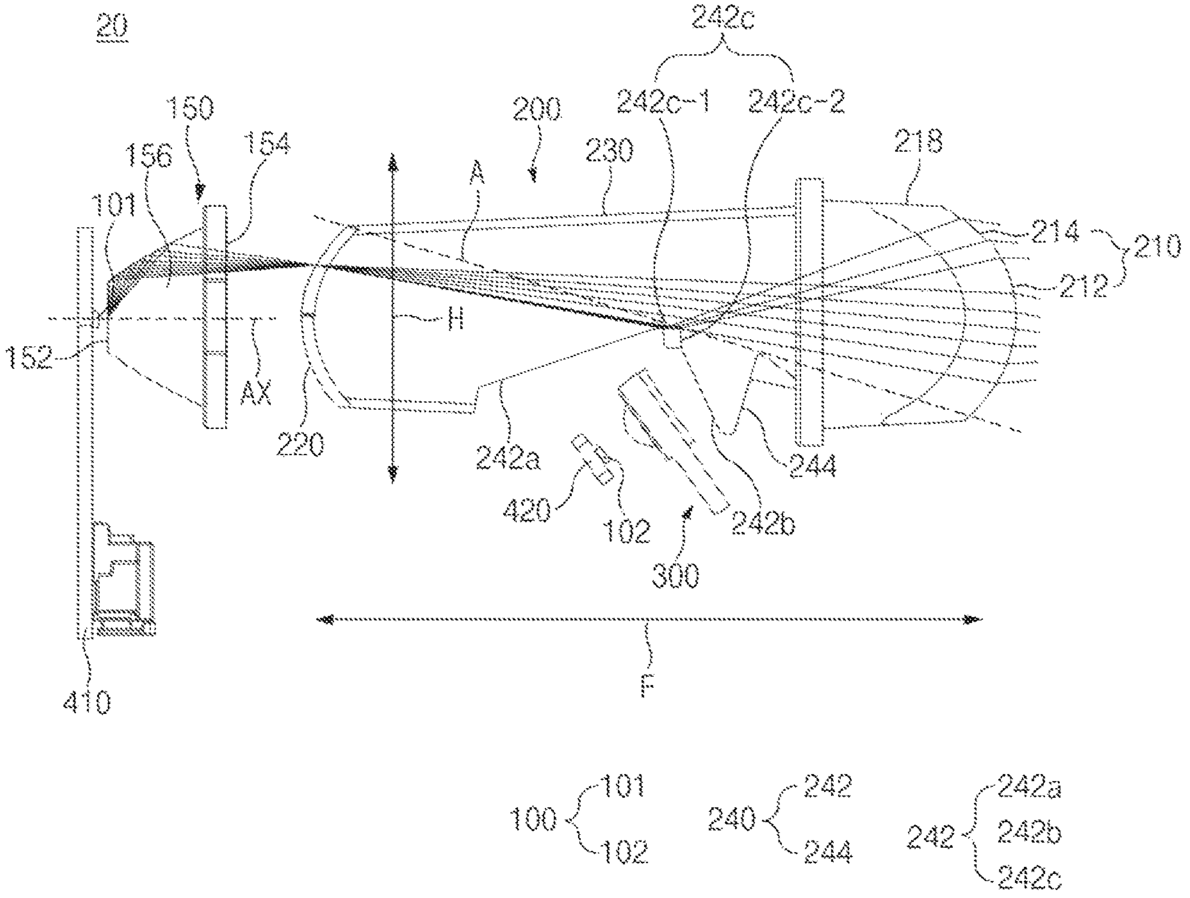
FIG. 2 is a side view illustrating a lamp module for a vehicle according to an embodiment of the present disclosure.
Figure 3:
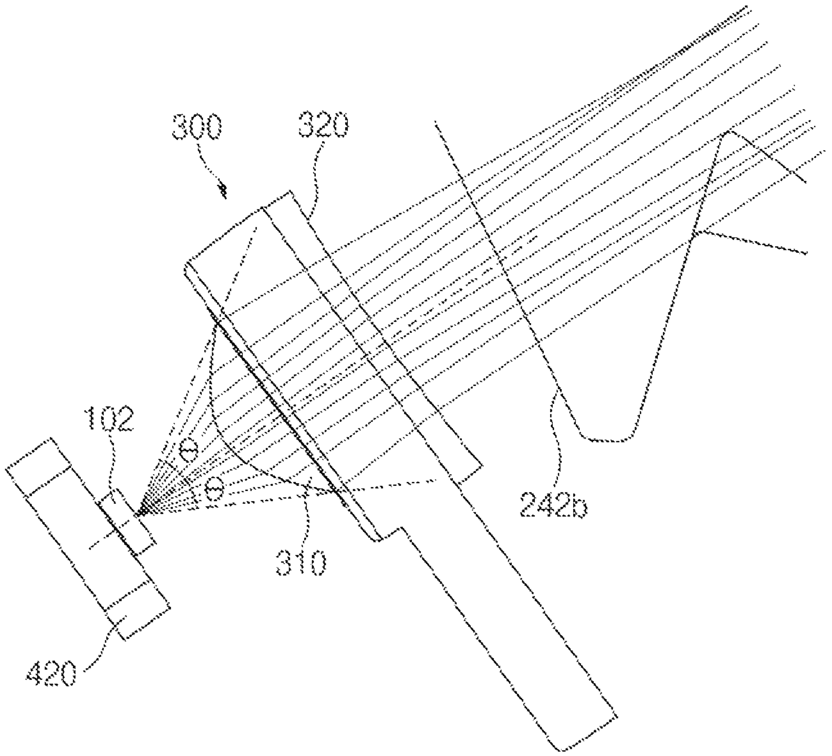
FIG. 3 is an enlarged side view illustrating a second light source and a second optic member of a lamp module for a vehicle according to an embodiment of the present disclosure.

FIG. 1 is a perspective view illustrating a lamp module for a vehicle according to an embodiment of the present disclosure. FIG. 2 is a side view illustrating the lamp module for a vehicle according to an embodiment of the present disclosure. FIG. 3 is an enlarged side view illustrating a second light source and a second optic member of the lamp module for a vehicle according to an embodiment of the present disclosure.

As illustrated in FIGS. 1 to 3, a lamp module 20 (hereinafter, will be referred to as a 'lamp module') according to the present disclosure may be a lamp module that may form two or more kinds of light distribution patterns. That is, the lamp module 20 according to the present disclosure may individually form a first light distribution pattern and a second light distribution pattern that is different from the first light distribution pattern. As an example, the first light distribution pattern may be a low beam pattern, and the second light distribution pattern may be a DRL pattern. However, the kinds of the first light distribution pattern and the second light distribution pattern are not limited to the above-described contents, and may be applied to various kinds of beam patterns.

The lamp module 20 according to the present disclosure may include a plurality of light sources 100 for forming two or more kinds of light distribution patterns, and a light guide part 200 that is provided (or disposed) on one side of the plurality of light sources 100 and faces the plurality of light sources 100. The light guide part 200 may be an integrally formed lens. Accordingly, according to the present disclosure, because the first light distribution pattern and the second light distribution pattern may be formed through the one integral lens, that is, the light guide part 200, one light emission surface may be shared through the one light guide part even when the light distribution pattern having different functions is formed, and the lamp module may be differentiated in an aspect of design of the vehicle.

A surface of the light guide part 200 may be divided into a plurality of areas according to locations thereof. In more detail, the light guide part 200 may include a front part 210 that defines a front area of the light guide part, a rear part that defines a rear area of the light guide part, an upper part 230 that defines an upper area that defines an upper area of the light guide part, and a lower part 240 that defines a lower area of the light guide part. In particular, as illustrated in FIG. 2, a first recessed area 242 having a shape that is recessed upwards may be formed on the lower surface 240 of the light guide part 200.

Furthermore, the light source 100 may include a first light source 101 that is provided on a rear side of the light guide part 200 and faces the rear surface of the light guide part 200, and a second light source 102 that is provided on a lower side of the light guide part 200 and faces the lower surface 240 of the light guide part 200. As an example, the first light source 101 and the second light source 102 may be LEDs, but the kind of the light sources is not limited to an LED.

According to the present disclosure, at least a portion of the light output from the first light source 101 may be output externally through the rear surface of the light guide part 200 to form the first light distribution pattern, and at least a portion of the light output from the second light source 102 may be output externally through the first recessed area 242 of the light guide part 200 to form the second light distribution pattern. Preferably, the second light distribution pattern may be formed on an upper side of the first light distribution pattern.

Meanwhile, the lamp module 20 according to the present disclosure may further include a first optic member 150 that is provided between the first light source 101 and the light guide part 200, to which the light output from the first light source 101 is input, and which outputs the light input from the first light source 101 to the light guide part 200.

The first optic member 150 may include an optic rear surface 152 that is provided on a rear side of the first optic member 150 and faces the first light source 101, an optic front surface 154 that is provided on a front side of the first optic member 150 and faces the light guide part 200, and an optic connection surface 156 that connects the optic rear surface 152 and the optic front surface 154.

According to the present disclosure, at least a portion of the light output from the first light source 101 and input to the first optic member 150 may be substantially entirely reflected by the optic connection surface 156 and be input to the light guide part 200. In more detail, as illustrated in FIGS. 1 and 2, a size of the optic rear surface 152 may be smaller than a size of the optic front surface 154, and the optic connection surface 156 that connects the optic rear surface 152 and the optic front surface 154 may have a shape, of which a size in a height direction "H" and a widthwise direction "W" becomes larger as it goes to a front side in a forward/rearward direction "F". For example, the optic connection surface 156 may have a shape of a partial area of a cone.

In particular, the present disclosure may have an optical path, in which at least portions of the light that is output from the first light source 101 and reaches the optic connection surface 156 cross each other in the height direction "H". That is, the optic connection surface 156 may have a shape having an optical path, in which at least portions of the light output from the first light source 101 and substantially entirely reflected by the optic connection surface 156 cross each other in the height direction "H" when the light guide part 200 is viewed from one side of the widthwise direction "W". Accordingly, because the at least portions of the light cross each other in the height direction "H" even when chromatic aberrations occur as a refraction degree of the light output from the first light source 101 in the first optic member 150 according to a wavelength thereof is rather changed, lights that are input to the light guide part 200 and have different wavelengths may be mixed. Accordingly, color deviations for areas of the light distribution pattern due to the above-described chromatic aberrations may be solved. Hereinafter, features of the optic connection surface 156 will be described in detail.

According to the present disclosure, the optic connection surface 156 may have an optical path, in which at least portions of the light output from the first light source 101 and substantially entirely reflected by the optic connection surface 156 cross each other in the height direction "H" after meeting each other in one area. In more detail, at least portions of the light substantially entirely reflected by the optic connection surface 156 may cross each other in the height direction "H" after meeting each other at a focus of the optic connection surface 156. As an example, the optic connection surface 156 may have a rotational symmetrical shape with respect to a central axis AX that extends in the forward/rearward direction "F", and a set of the focuses of the optic connection surface 156 may have a circular shape, a center of which is the central axis AX. Accordingly, according to the present disclosure, the light substantially entirely reflected by the optic connection surface 156 may reach a focus of the substantially entirely reflected portion. FIG. 2 illustrates, as an example, a state, in which the lights substantially entirely reflected in an upper area of the optic connection surface 156 cross each other in the height direction "H" after meeting each other at the focus of the optic connection surface 156.

Referring now to FIGS. 1 to 3, the lamp module 20 according to the present disclosure may further include a second optic member 300 that is provided between, among the plurality of light sources 100, some light sources and the light guide part 200 and to which the light output from the some light sources is input. The second optic member 300 is a configuration for transmitting light, and may be a configuration for effectively using the light output from the some light sources more effectively by concentrating and outputting the light output from the some light sources. In more detail, the second optic member 300 may be provided to face the second light source 102. Accordingly, according to the present disclosure, because the light output from the second light source 102 may be output externally after being concentrated in the second optic member 300, the second light source 102 may be used more effectively, and the light distribution formed by the second light distribution pattern also may be easily formed to satisfy the rules.

Meanwhile, an area of the light guide part 200, to which the first light source 101 is input, and an area, to which the second light source 102 is input, may be spaced apart from each other. In more detail, referring to FIG. 2, the light guide part 200 may include a first input surface 220, which is formed on a rear surface of the light guide part 200 and to which at least a portion of the light output from the first light source 101 is input, and a second input surface 242*b* which is formed in the first recessed area 242 of the light guide part 200 and to which at least a portion of the light output from the second light source 102 and input to the second optic member 300 is input. As an example, the first input surface 220 may correspond to the entire rear surface of the light guide part 200.

Furthermore, as illustrated in FIG. 2, according to the present disclosure, the second input surface 242*b* may be located on a lower side of a function division surface "A" that is an imaginary surface obtained by connecting an uppermost end of the rear surface of the light guide part 200 and a lowermost end of the front surface 210 of the light guide part 200. Then, an uppermost end of the rear surface of the light guide part 200 may be understood as an area of the rear surface of the light guide part 200, which meets the upper surface 230 of the light guide part 200, and a lowermost end of the front surface 210 of the light guide part 200 may be understood as an area of the front surface 210 of the light guide part 200, which meets the lower surface 240 of the light guide part 200.

The function division surface "A" is a surface that virtually divides the light guide part 200 to two areas by connecting the uppermost end of the rear surface of the light guide part 200 and the lowermost end of the front surface 210 thereof, and may be the above-described surface that is a reference for distinguishing an area for forming the first light distribution pattern and an area for forming the second light distribution pattern.

That is, according to the present disclosure, because the second input surface 242*b* is located on a lower side of the function division surface "A", the light output from the first light source 101 and input to the first input surface 220 and the light output from the second light source 102 and input to the second input surface 242*b* may be prevented from crossing each other or being interfered by each other, and thus, different light distribution patterns may be prevented from crossing each other or being interfered with each other.

As described above, the second optic member 300 may be a configuration that concentrates and then outputs the light output from the second light source 102. Then, the second optic member 300 may include an optic input area 310, which is formed in an area that faces the second light source 102 and to which at least a portion of the light output from the second light source 102 is input, and an optic output area 320, which is formed on an opposite side to a portion of the second optic member 300, at which the optic input area 310 is formed, and from which at least a portion of the light input to the optic input area 310 is output. In more detail, the optic output area 320, as illustrated in FIG. 2, may face the second input surface 242*b*. Preferably, most of the light output from the second light source 102 may be input to the optic input area 310.

Then, the optic input area 310 may be formed to concentrate the light output from the second light source 102 and input to the optic input area 310, and the optic output area 320 may be formed to diffuse the light concentrated by the optic input area 310. To achieve the above-described objective, the optic input area 310 may include a convex lens shape that protrudes toward the second light source 102, and the optic output area 320 may include a concave lens shape that is recessed toward the second light source 102. That is, according to the present disclosure, the light output from the second light source 102 may be diffused in an area of the optic input area 310, which has the concave lens shape, when being output from the optic output area 320 after being concentrated in an area having the convex lens shape.

Meanwhile, the convex lens formed in the optic input area 310 may have a size within a specific range. For example, referring to FIG. 3, an angle θ defined by a direction that faces an upper end or a lower end of the convex lens of the optic input area 310 from the second light source 102 and a direction that faces a middle area of the convex lens from the second light source 102 may be 25 to 35 degrees. This is because the rule items required for a DRL pattern may be satisfied when the second light distribution pattern formed by the light output from the second light source 102 is the DRL pattern. More preferably, as illustrated in FIG. 3, i) an angle defined by a direction that faces an upper end of the convex lens of the optic input area 310 from the second light source 102 and a direction that faces a middle area of the convex lens from the second light source 102, and ii) an angle defined by a direction that faces a lower end of the convex lens of the optic input area 310 from the second light source 102 and a direction that faces a middle area of the convex lens from the second light source 102 may be the same.

Furthermore, the first input surface 220 of the light guide part 200 may have a curved shape that protrudes convexly toward a rear side of the light guide part 200, that is, toward the first light source 101. Accordingly, the light output from the first light source 101 and substantially entirely reflected in the first optic member 150 may be concentrated while passing through the first input surface 220.

Meanwhile, the above-described first recessed area 242 may be divided to a plurality of areas. In more detail, referring to FIGS. 1 and 2, the first recessed area 242 may include a first surface 242*a* that is provided in a rear area of the first recessed area 242 and is formed to be inclined upwards as it goes to a front side, and a second surface 242*b* that is provided in a front area of the first recessed area 242 and is formed to be inclined downwards as it goes to a front side. In particular, the second surface 242*b* may be the above-described second input surface. As an example, as illustrated in FIG. 2, the second light source 102 may be provided in a width of the first surface 242*a* in the forward/rearward direction.

Referring now to FIGS. 1 and 2, the first recessed area 242 may further include a third surface 242*c* that connects an upper end of the first surface 242*a* and an upper end of the second surface 242*b*. Then, the third surface 242*c* may include a front extension section 242*c*-1 that extends from the first surface 242*a* to a front side, and a lower extension section 242*c*-2 that extends from a front end of the front extension section 242*c*-1 to a lower side and is connected to an upper end of the second surface 242*b*. That is, the third surface 242*c* may be understood as having a substantially "L" shape when the light guide part 200 is viewed from a lateral side.

Then, referring to FIG. 2, when the light guide part 200 is viewed from one side of the widthwise direction "W", an area, in which at least portions of the light output from the first light source 101 and substantially entirely reflected by the optic connection surface 156 of the first optic member 150 cross each other in the height direction "H", may be formed on a rear side of the third surface 242*c* and may be formed on a front side of the optic front surface 154 of the first optic member 150.

Referring to FIG. 1, a portion of the light input to the light guide part 200 is output externally through the front surface 210 of the light guide part 200 after being substantially entirely reflected by the third surface 242*c*, in more detail, the front extension section 242*c*-1. Accordingly, according to the present disclosure, the lights substantially entirely reflected by the optic connection surface 156 may reach the front extension section 242*c*-1 after crossing each other in the height direction "H" first.

Meanwhile, for example, a curvature of the optic rear surface 152 of the first optic member 150 may be larger than a curvature of the optic front surface 154. However, a relationship between the curvature of the optic rear surface 152 and a curvature of the optic front surface 154 is not limited to the above-described contents.

Meanwhile, the first surface 242*a* may have a linear shape when the first recessed area 242 provided in the lamp module 20 according to the present disclosure is cut in a horizontal direction. This may be understood that the first surface 242*a* has a planar shape. However, unlike this, the first surface 242*a* may have a parabolic shape when the first recessed area 242 is cut in a horizontal direction.

Furthermore, according to the present disclosure, a reflective layer may be formed on a surface of the first surface 242*a*. Accordingly, according to the present disclosure, the light output from the first light source 101, which reached the first surface 242*a*, may be reflected while not passing therethrough. As described above, the first light distribution pattern formed by the light output from the first light source 101 may be a low beam pattern, and the above-described reflective layer may contribute to satisfying the rule items required for the low beam pattern by preventing the above-described reflective layer from being output from the first light source 101 and the light that reached the first surface 242*a* from being output to a front side. However, unlike the above description, the reflective layer may not be formed on a surface of the first surface 242*a*.

In addition, to satisfy the rule items required for the low beam pattern, a cutoff part having a step or stepped shape may be further formed in the first recessed area. In more detail, the third surface 242*c* may further include a cutoff part having a stepped shape, in which heights of opposite surfaces, which are formed in the front extension section 242C-1 and are spaced apart from each other in the widthwise direction "W" (a direction that exits or enters a ground surface with reference to FIG. 2), are different. As described above, the first light distribution pattern formed by the first light source 101 may be a low beam pattern, and the cutoff part may be a configuration for forming a cutoff line that is required to be formed in an upper border area of the low beam pattern according to the rules. That is, according to the present disclosure, the low beam pattern having the cutoff line may be formed because a portion of the light output from the first light source 101 is cut off by the cutoff part.

Meanwhile, according to the present disclosure, unlike the rear surface of the light guide part 200 having a single curved shape, that is, the first input surface 220, the front surface 210 of the light guide part 200 may include a plurality of curved areas. In more detail, referring to FIG. 1, the front surface 210 of the light guide part 200 may include a first curved area 212 having a curved shape that protrudes convexly toward a front side of the light guide part 200, and a second curved area 214 that is provided on an upper side of the first curved area 212 and has a curved shape that is concavely recessed toward a rear surface.

The first curved area 212 may be an area which the light output from the first light source 101 and input to the first input surface 220 reaches, and the second curved area 214 may be an area which the light output from the second light source 102 and input to the second input surface 242*b* reaches. That is, the above-described first light distribution pattern may be formed by the light output from the first light source 101, which passes through the first curved area 212, and the above-described second light distribution pattern may be formed by the light output from the second light source 102, which passes through the second curved area 214. Meanwhile, the light output from the first light source 101 may not reach the second curved area 214, and the light output from the second light source 102 may not reach the first curved area 212. Furthermore, the second optic member 300 may be provided between the second light source 102 and the second input surface 242*b*, and at least a portion (more preferably, most of the light output from the second light source) of the light output from the second light source 102 may reach the second curved area 214 via the second optic member 300 and the second input surface 242*b*.

As an example, as illustrated in FIG. 1, a portion of the second curved area 214 may be located on a lower side of an upper border of the first curved area 212, and another portion of the second curved area 214 may be located on an upper side of the upper border of the first curved area 212. This may be understood that a partial area of the upper border of the first curved area 212 has a shape that is recessed downwards and the second curved area 214 contacts the first curved area 212 in an area of the upper border of the first curved area 212, which is recessed downwards. However, when viewed as a whole, the second curved area 214 may be located on an upper side of the first curved area 212. Meanwhile, a size of the convex lens area of the optic input area 310 may correspond to a size of the second curved area 214 so that the light output from the second light source 102 and input to the convex lens area of the optic input area 310 reaches the second curved area 214.

Furthermore, according to the present disclosure, the first curved area 212 and the second curved area 214 may have different radii of curvature.

In more detail, as illustrated in FIG. 1, an average radius of curvature of the second curved area 214 may be smaller than an average radius of curvature of the first curved area 212, and a size of the second curved area 214 may be smaller than a size of the first curved area 212. More preferably, a radius of curvature of the second curved area 214 at a vicinity of an area, in which the first curved area 212 and the second curved area 214 meet each other, may be smaller than a radius of curvature of the first curved area 212.

Meanwhile, referring to FIG. 1, the front surface 210 of the light guide part 200 may further include an additional area 218 that is formed on an upper side of the first curved area 212 and surrounds the second curved area 214. The additional area 218 may have a radius of curvature that is different from those of the first curved area 212 and the second curved area 214 to distinguish the first curved area 212 and the second curved area 214. As illustrated in FIG. 1, a partial area of a lower border of the additional area 218 may have a shape that is recessed upwards, and the second curved area 214 may contact the additional area 218 in the area of the lower border of the additional area 218, which is recessed upwards. That is, an entire circumference of the second curved area 214 may be surrounded by the first curved area 212 and the additional area 218. The additional area 218 may have a curved shape, but may have a planar shape. When the additional area 218 may have a curved shape, a radius of curvature of the additional area 218 may be larger than radii of curvature of the first curved area 212 and the second curved area 214.

Unlike the first curved area 212 and the second curved area 214, the additional area 218 may be a configuration that substantially does not contribute to formation of the first light distribution pattern and the second light distribution pattern. That is, according to the present disclosure, the light output from the first light source 101 and the second light source 102 may not reach the additional area 218, or an amount of the light, which cannot substantially contribute to forming the light distribution pattern, may reach the additional area 218. However, the additional area 218 may contribute to securing an aesthetic performance of the lamp module 20 even when the lamp module 20 is not turned on, by preventing the configurations, such as the first light source 101, the second light source 102, and the first optic member 150, which are provided in the lamp module 20 according to the present disclosure, from being viewed from an outside.

Meanwhile, as illustrated in FIGS. 1 and 2, the lower surface 240 of the light guide part 200 may further include an inclined surface 244 that extends from a lower end of the first recessed area 242 and is formed to be inclined upwards as it goes to a front side. In more detail, the inclined surface 244 may be located on a front side of the first recessed area 242, and may extend from a lower end of the second surface 242*b*.

Then, a reflective layer may be formed on a surface of the inclined surface 244. The reflective layer formed on a surface of the inclined surface 244 may prevent the light from the second light source 102 from reaching the first curved area 212 by cutting off a portion of the light output by the second light source 102. Meanwhile, as illustrated in FIG. 2, the inclined surface 244 may be located on a lower side of the function division surface “A”. However, unlike the above description, the reflective layer may not be formed on a surface of the inclined surface 244.

Meanwhile, referring to FIG. 2, a lowermost end of the second curved area 214 may be located on an imaginary surface obtained by connecting the second light source 102 and an uppermost end of the inclined surface 244 or may be located on a lower side of the imaginary surface. Then, the lowermost end of the second curved area 214 may mean a border, at which the second curved area 214 and the first curved area 212 meet each other. This is because the light output from the second light source 102 is prevented from reaching the first curved area 212.

Referring now to FIG. 1, the lamp module 20 according to an embodiment of the present disclosure may include a first board 410, to which the first light source 101 is bonded, a second board 420, to which the second light source 102 is bonded, and a heat sink 500, to which the first board 410 is attached. The heat sink 500 may be a configuration for absorbing heat generated in the first light source 101 and externally emitting the heat. FIG. 1 illustrates, as an example, a state, in which the second light source 102 and the second board 420 are spaced apart from the heat sink 500. This is because the heat generated in the second light source 102 is lower than the heat generated in the first light source 101 when the first light source 101 forms a low beam pattern and the second light source 102 forms a DRL pattern whereby the second light source 102 does not require emission of heat by the heat sink.

Figure 4:
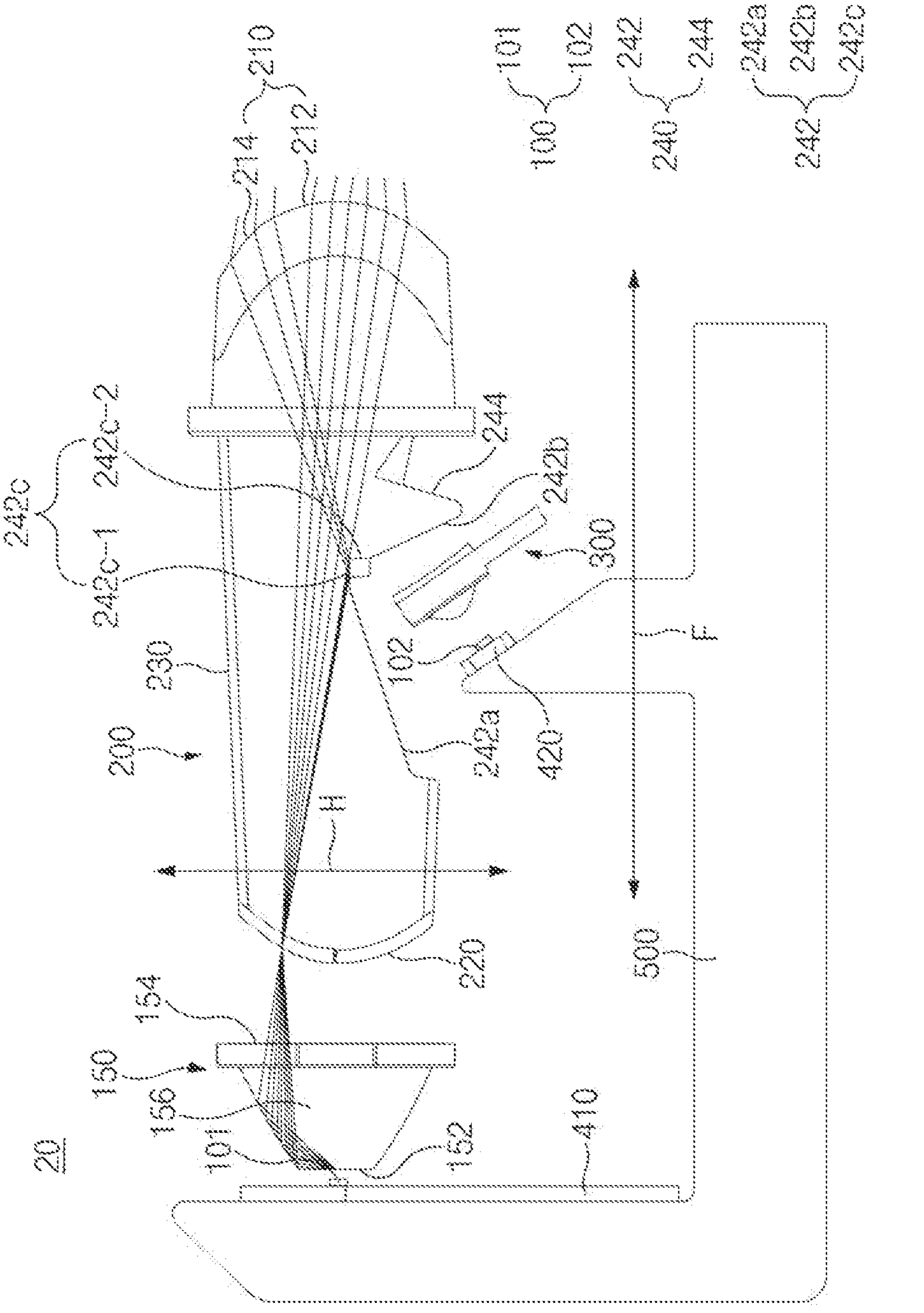
FIG. 4 is a side view illustrating another example of a lamp module for a vehicle according to another embodiment of the present disclosure.

FIG. 4 is a side view illustrating another example of the lamp module for a vehicle according to another embodiment of the present disclosure.

The above-described contents of the lamp module 20 according to the present disclosure also may be applied to the lamp module 20 according to another example of the present disclosure. However, another example of the present disclosure is different from an example of the present disclosure in that the heat sink 500 is provided to emit heat generated in the second light source 102.

In more detail, according to another example of the present disclosure, the lamp module may include the first board 410, to which the first light source 101 is bonded, the second board 420, to which the second light source 102 is bonded, and the heat sink 500 attached to the first board 410 and the second board 420.

Then, an area of the heat sink 500, to which the first board 410 is bonded, and an area thereof, to the second board 420 is bonded, may be integrally formed. Then, because the first light source 101 faces the rear surface of the light guide part 200 whereas the second light source 102 faces the lower surface 240 of the light guide part 200, it is necessary for the heat sink 500 to have a shape that is bent to have a substantially L shape as illustrated in FIG. 4 whereby the heat sink 500 absorbs all the heat generated in the first light source 101 and the second light source 102.

Lamp for Vehicle

Figure 5:
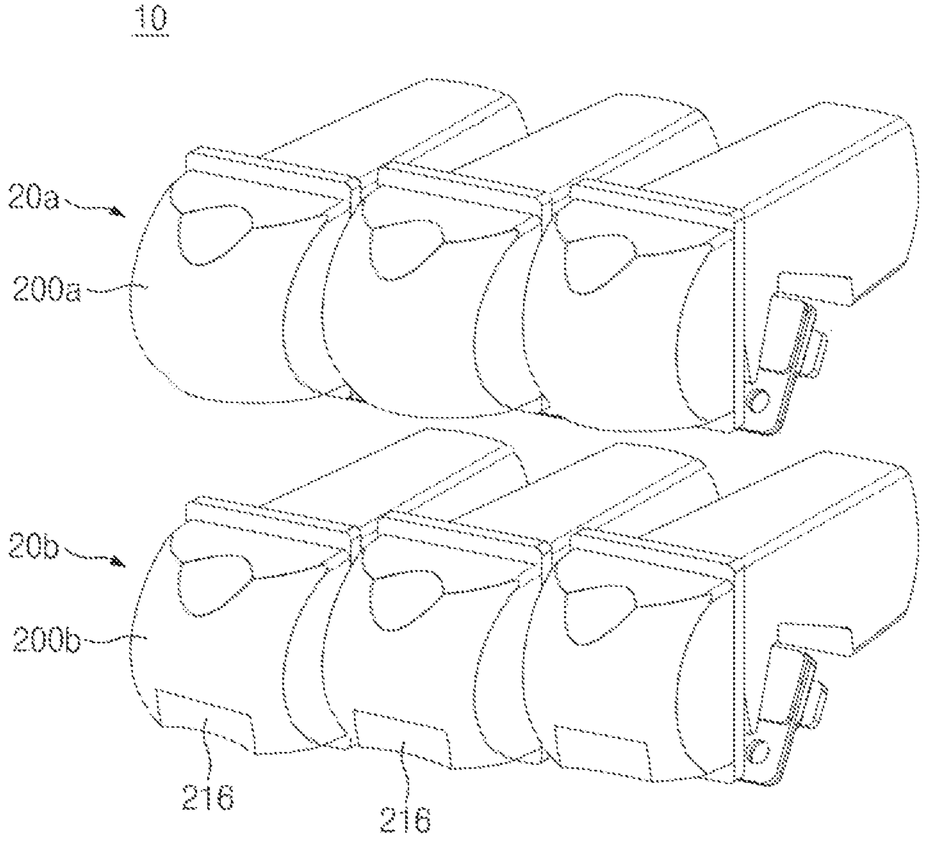
FIG. 5 is a lamp for a vehicle including a plurality of lamp modules for a vehicle according to the present disclosure.

FIG. 5 is a lamp for a vehicle including a plurality of lamp modules for a vehicle according to the present disclosure.

Referring to FIGS. 1 to 5, a lamp 10 (hereinafter, will be referred to as a ‘lamp’) for a vehicle according to the present disclosure may include a plurality of lamp modules 20.

The lamp module 20 may include the first light source 101 that outputs the light, the light guide part 200 that is provided on a front side of the first light source 101, and the first optic member 150, to which the light output from the first light source 101 is input and which outputs the light input to the light guide part 200 from the first light source 101. Meanwhile, the first recessed area 242 having a shape that is recessed upwards may be formed on a lower surface of the light guide part 200.

Furthermore, the first optic member 150 may include the optic rear surface 152 that is provided on a rear side of the first optic member 150 and faces the first light source 101, the optic front surface 154 that is provided on a front side of the first optic member 150 and faces the light guide part 200, and the optic connection surface 156 that connects the optic rear surface 152 and the optic front surface 154. According to the present disclosure, at least a portion of the light output from the first light source 101 and input to the first optic member 150 may be substantially entirely reflected by the optic connection surface 156 and be input to the light guide part 200. Meanwhile, the contents of the lamp modules 20 provided in the lamp 10 according to the present disclosure will be replaced by the contents described above with reference to FIGS. 1 to 4.

Referring to FIG. 5, the plurality of lamp modules may include a plurality of upper lamp modules 20*a* that are provided on an upper side and are arranged in a horizontal direction, and a plurality of lower lamp modules 20*b* that are provided on a lower side of the upper lamp modules 20 and are arranged in a horizontal direction. A description of the upper lamp module 20*a* and the lower lamp module 20*b* will be replaced by the contents described with reference to FIGS. 1 to 4 in relation to the lamp module according to the present disclosure.

However, according to the present disclosure, a shape of a front surface of an upper light guide part 200*a* provided in the upper lamp module 20*a* and a shape of a front surface of a lower light guide part 200*b* provided in the lower lamp module 20*b* may be different. Hereinafter, the shapes of the light guide parts 200 provided in the upper lamp module 20*a* and the lower lamp module 20*b* will be described.

Referring to FIGS. 1, 2, and 5, the front surface of the lower light guide part 200*b* may further include a second recessed area 216 that is provided on a lower side of the first curved area 212, in addition to the first curved area 212 and the second curved area 214, which have been described above, and has a shape that is recessed upwards. Meanwhile, the above-described second recessed area may not be provided on the front surface of the upper light guide part 200*a*. That is, in the lamp 10 according to the present disclosure, the second recessed area 216 may be provided only in the plurality of lower lamp modules 20*b*.

According to the present disclosure, a lamp module having a structure that may be differentiated in an aspect of design of a vehicle by, one lamp for a vehicle, performing two or more functions such that one light emission surface may be shared even when lamps of different functions are turned on are provided.

Furthermore, according to the present disclosure, a lamp module for a vehicle that may enhance a product value of a light distribution pattern by minimizing chromatic aberrations that occur as refraction indexes of lenses are different according to wavelengths of light are provided.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp module for a vehicle, comprising:
a first light source configured to output light;
a light guide part disposed in front of the first light source and including a first input surface facing the first light source; and
a first optic member disposed between the first light source and the light guide part and configured to transmit the light output from the first light source toward the first input surface of the light guide part,
wherein the light guide part includes a first recessed area spaced apart from the first input surface and recessed inwardly from a lower surface of the light guide part,
wherein the first optic member includes:
a rear portion having an optic rear surface facing the first light source;
a front portion having an optic front surface facing the light guide part; and
an optic connection surface coupled between the optic rear surface and the optic front surface,
wherein at least a portion of the light transmitted from the first light source to the first optic member is reflected by the optic connection surface and transmitted to the light guide part,
wherein the first recessed area includes:
a rear area having a first surface;
a front area having a second surface; and
a third surface disposed between an upper end of the first surface and an upper end of the second surface, and
wherein a first area, in which at least the portion of the light output from the first light source and reflected by the optic connection surface crosses a height direction (H) when the light guide part is viewed from one side of a widthwise direction (W) is formed on a rear side of the third surface.

2. The lamp module of claim 1, wherein the optic connection surface has a shape having an optical path, in which at least portion of the light output from the first light source and reflected by the optic connection surface crosses a height direction (H) when the light guide part is viewed from a side of a widthwise direction (W).

3. The lamp module of claim 2, wherein, in the optic connection surface, at least portion of the light output from the first light source and reflected by the optic connection surface crosses the height direction (H) after meeting each other in one area.

4. The lamp module of claim 2, wherein the optic connection surface has a rotationally symmetrical shape with respect to a central axis extending in a forward/rearward direction (F) of the lamp module.

5. The lamp module of claim 4, wherein a set of focuses of the optic connection surface has a circular shape, and a center of the circular shape is the central axis (AX).

6. The lamp module of claim 1, wherein the first area is disposed in front of the optic front surface.

7. The lamp module of claim 1, wherein a curvature of the optic rear surface is larger than that of the optic front surface.

8. The lamp module of claim 1, wherein:
the first surface is inclined upwardly in a forward direction of the lamp module,
the second surface is inclined downwardly in the forward direction of the lamp module, and
the third surface includes:
a front extension section extending in the forward direction from the first surface; and
a lower extension section extending downwardly from a front end of the front extension section and connected to the second surface.

9. The lamp module of claim 8, wherein the third surface further includes a cutoff part formed in the front extension section and having a step shape, in which heights of opposite side surfaces thereof, which are spaced apart from each other in the widthwise direction (w), are different.

10. The lamp module of claim 1, wherein a front surface of the light guide part includes:
a first curved area having a curved shape protruding convexly toward a front side of the light guide part; and
a second curved area disposed above the first curved area and having a curved shape recessed convexly toward a rear side.

11. The lamp module of claim 10, wherein a curvature of the second curved area has a radius smaller than that of a curvature of the first curved area.

12. The lamp module of claim 10, further comprising a second light source disposed below the light guide part and facing the lower surface of the light guide part,
wherein at least a portion of the light output from the first light source is output externally through a rear surface of the light guide part to form a first light distribution pattern, wherein at least a portion of the light output from the second light source is output externally through the first recessed area of the light guide part to form a second light distribution pattern, wherein the first light distribution pattern includes a portion of the light output from the first light source and transmitted through the first curved area, and wherein the second light distribution pattern includes a portion of the light output from the second light source and transmitted through the second curved area.

13. A lamp module for a vehicle, comprising:

a first light source configured to output light;

a light guide part disposed in front of the first light source and including a first input surface facing the first light source;

a first optic member disposed between the first light source and the light guide part and configured to transmit the light output from the first light source toward the first input surface of the light guide part;

a second light source disposed below the light guide part and facing a lower surface of the light guide part; and a second optic member facing the second light source, wherein the light guide part includes a first recessed area spaced apart from the first input surface and recessed inwardly from the lower surface of the light guide part, wherein the first optic member includes:

a rear portion having an optic rear surface facing the first light source;

a front portion having an optic front surface facing the light guide part; and an optic connection surface coupled between the optic rear surface and the optic front surface, and wherein at least a portion of the light transmitted from the first light source to the first optic member is reflected by the optic connection surface and transmitted to the light guide part.

14. The lamp module of claim 13, wherein:

the first input surface of the light guide part is disposed at a rear surface of the light guide part and configured to receive at least a portion of the light output from the first light source, the light guide part further includes a second input surface disposed at the first recessed area of the light guide part and configured to receive at least a portion of the light output from the second light source and input to the second optic member, and the second input surface is located on a lower side of a function division surface that is an imaginary surface obtained by connecting an uppermost end of the rear surface of the light guide part and a lowermost end of a front surface of the light guide part.

15. The lamp module of claim 13, wherein:

the second optic member includes:

an optic input area facing the second light source and configured to receive at least a portion of the light output from the second light source; and an optic output area disposed opposite to the optic input area and configured to receive at least a portion of the light input to the optic input area, the optic input area is configured to concentrate the light output from the second light source and input to the optic input area, and the optic output area is configured to diffuse the light concentrated in the optic input area.

16. The lamp module of claim 15, wherein:

the optic input area has a convex lens shape protruding toward the second light source, and the optic output area has a concave lens shape recessed toward the second light source.

17. A lamp module for a vehicle, comprising:

a first light source configured to output light;

a light guide part disposed in front of the first light source and including a first input surface facing the first light source; and a first optic member disposed between the first light source and the light guide part and configured to transmit the light output from the first light source toward the first input surface of the light guide part, wherein the light guide part includes a first recessed area spaced apart from the first input surface and recessed inwardly from a lower surface of the light guide part, wherein the first optic member includes:

a rear portion having an optic rear surface facing the first light source;

a front portion having an optic front surface facing the light guide part; and an optic connection surface coupled between the optic rear surface and the optic front surface, wherein at least a portion of the light transmitted from the first light source to the first optic member is reflected by the optic connection surface and transmitted to the light guide part, wherein the lower surface of the light guide part further includes an inclined surface provided on a front side of the first recessed area, extending from a lower end of the first recessed area, and inclined upwardly in a forward direction of the lamp module, and wherein the inclined surface is located on a lower side of a function division surface that is an imaginary surface obtained by connecting an uppermost end of a rear surface of the light guide part and a lowermost end of a front surface of the light guide part.

* * * * *